United States Patent
Zhu et al.

(10) Patent No.: US 11,531,227 B2
(45) Date of Patent: Dec. 20, 2022

(54) ANTI-PEEP FILM AND MANUFACTURING METHOD THEREOF, AND DISPLAY MODULE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Heling Zhu, Beijing (CN); Jian Sang, Beijing (CN); Lu Yu, Beijing (CN); Pengfei Cheng, Beijing (CN); Gongtao Zhang, Beijing (CN); Haiwei Sun, Beijing (CN); Dongjia Hao, Beijing (CN)

(73) Assignees: BEIJING BOE OPTOELECTRONICS TECHNOLOGY CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 42 days.

(21) Appl. No.: 16/957,243

(22) PCT Filed: Dec. 20, 2019

(86) PCT No.: PCT/CN2019/126967
§ 371 (c)(1),
(2) Date: Jun. 23, 2020

(87) PCT Pub. No.: WO2020/140770
PCT Pub. Date: Jul. 9, 2020

(65) Prior Publication Data
US 2021/0223609 A1 Jul. 22, 2021

(30) Foreign Application Priority Data
Jan. 2, 2019 (CN) .......................... 201910002791.4

(51) Int. Cl.
*G02F 1/1335* (2006.01)
(52) U.S. Cl.
CPC .. *G02F 1/133509* (2013.01); *G02F 1/133607* (2021.01)
(58) Field of Classification Search
CPC ......... G02F 1/133509; G02F 1/133607; G02F 1/133606; G02F 1/133514; G02F 1/1336;
(Continued)

(56) References Cited

U.S. PATENT DOCUMENTS

2006/0245060 A1* 11/2006 Goto ....................... G02B 5/003
359/613
2009/0027591 A1* 1/2009 Hwang ............. G02F 1/133514
349/64

(Continued)

FOREIGN PATENT DOCUMENTS

CN          1806187 A     7/2006
CN       104375224 A     2/2015

(Continued)

OTHER PUBLICATIONS

First Office Action Office Action dated Apr. 3, 2020 issued in corresponding Chinese Application No. 201910002791 4.

(Continued)

*Primary Examiner* — Hoan C Nguyen
(74) *Attorney, Agent, or Firm* — Nath, Goldberg & Meyer; Joshua B. Goldberg

(57) ABSTRACT

The present disclosure provides an anti-peep film and a manufacturing method thereof, and a display module. The anti-peep film includes a plurality of transmission areas and a plurality of anti-peep areas, and the plurality of transmission areas and the plurality of anti-peep areas are alternately arranged in a direction perpendicular to a thickness direction of the anti-peep film. At least one anti-peep area of the (Continued)

plurality of anti-peep areas has a set structure, and the set structure enables that light incident on the at least one anti-peep area from a first side in the thickness direction of the anti-peep film is reflected back to the first side through the at least one anti-peep area.

12 Claims, 7 Drawing Sheets

(58) Field of Classification Search
CPC ......... G02F 1/133528; G02F 1/133504; C08K 3/22; C08K 2003/2241; C08L 63/10; C08L 67/06; C08L 75/14; B32B 27/08; B32B 27/36; B32B 3/12; B32B 3/20; B32B 3/266; B32B 37/0038; B32B 38/00; B32B 2305/024; B32B 2305/026; B32B 2307/412; B32B 2551/00; G02B 17/04; G02B 5/045; G02B 2207/129; G02B 5/0263; G02B 5/30; G02B 5/3066; G02B 2207/123; G02B 5/0278; G02B 6/0053; G02B 5/0242; G02B 6/0036; G02B 6/0051; G02B 6/0028; G02B 5/0226
See application file for complete search history.

(56) References Cited

U.S. PATENT DOCUMENTS

| | | | |
|---|---|---|---|
| 2009/0116221 A1* | 5/2009 | Sato | G02B 5/045 |
| | | | 362/97.1 |
| 2010/0177406 A1* | 7/2010 | Walker | F24S 23/31 |
| | | | 359/710 |
| 2010/0214506 A1* | 8/2010 | Gaides | G02B 5/0263 |
| | | | 349/61 |
| 2014/0209581 A1* | 7/2014 | Pawlowski | G02B 27/0994 |
| | | | 219/121.69 |
| 2015/0192728 A1* | 7/2015 | Thompson | G02B 6/0005 |
| | | | 362/624 |
| 2018/0074375 A1* | 3/2018 | Koito | G02F 1/1313 |
| 2018/0328557 A1* | 11/2018 | Kitamura | G02B 5/0231 |
| 2020/0229538 A1* | 7/2020 | Yoshinaga | B29D 35/122 |
| 2021/0200002 A1* | 7/2021 | Kim | G02F 1/1323 |

FOREIGN PATENT DOCUMENTS

| | | |
|---|---|---|
| CN | 104880760 A | 9/2015 |
| CN | 105172234 A | 12/2015 |
| CN | 105383098 A | 3/2016 |
| CN | 105711211 A | 6/2016 |
| CN | 105842830 A | 8/2016 |
| CN | 105911760 A | 8/2016 |
| CN | 106154604 A | 11/2016 |
| CN | 106461812 A | 2/2017 |
| CN | 107664871 A | 2/2018 |
| CN | 108169948 A | 6/2018 |
| CN | 108445673 A | 8/2018 |
| CN | 109445173 A | 3/2019 |
| EP | 1956421 A1 | 8/2008 |
| JP | 2006184609 A | 7/2006 |
| JP | 4793191 B2 | 10/2011 |
| JP | 4903735 B2 | 3/2012 |
| WO | 01/53744 A1 | 7/2001 |
| WO | 2005/092544 A1 | 10/2005 |
| WO | 2007/047745 A1 | 4/2007 |

OTHER PUBLICATIONS

Second Office Action Office Action dated Sep. 9, 2020 issued in corresponding Chinese Application No. 201910002791.4.

* cited by examiner

ANTI-PEEP FILM AND MANUFACTURING METHOD THEREOF, AND DISPLAY MODULE

This is a National Phase Application filed under 35 U.S.C. 371 as a national stage of PCT/CN2019/126967, filed Dec. 20, 2019, an application claiming the benefit of Chinese Application No. 201910002791.4, filed Jan. 2, 2019, the content of each of which is hereby incorporated by reference in its entirety.

TECHNICAL FIELD

The present disclosure relates to the field of display technology, more particularly, to an anti-peep film and a manufacturing method thereof, and a display module.

BACKGROUND

With the popularization of display products such as mobile phones and notebooks, the protection of display content in various application scenarios has become a crucial issue. For example, in operations such as checking e-mails and reading materials on public transportation vehicles or airplanes, it is necessary to effectively protect the displayed content to prevent surrounding crowd from peeping. Therefore, it is particularly important to develop display products with an anti-peep function.

The inventor of the present disclosure found that current display products mostly use an anti-peep film to protect the displayed content; but a conventional anti-peep film has disadvantages of large thickness and low light transmittance. Although a purpose of protecting the displayed content is achieved, a display performance of the product is reduced, and power consumption of displaying is increased.

SUMMARY

According to one aspect of the present disclosure, provided is an anti-peep film, including: a plurality of transmission areas and a plurality of anti-peep areas. The plurality of transmission areas and the plurality of anti-peep areas are alternately arranged in a direction perpendicular to a thickness direction of the anti-peep film. At least one anti-peep area of the plurality of anti-peep areas has a set structure, and the set structure enables that light incident on the at least one anti-peep area from a first side in the thickness direction of the anti-peep film is reflected back to the first side through the at least one anti-peep area.

According to an embodiment of the present disclosure, the set structure includes a plurality of prisms, and the plurality of prisms are arranged along the thickness direction of the anti-peep film.

According to an embodiment of the present disclosure, at least one prism of the plurality of prisms is a quadrangular prism or a pentagonal prism.

According to an embodiment of the present disclosure, a refractive index of at least one transmission area of the plurality of transmission areas is smaller than a refractive index of the at least one prism.

According to an embodiment of the present disclosure, the at least one prism includes an incident surface, a first total reflection surface, a second total reflection surface, and an emission surface. Specific light incident on the at least one prism from the first side is able to be reflected back to the first side after transmitting through the incident surface, being totally reflected by the first and second total reflection surfaces, and transmitting through the emission surface; and an angle between the specific light and a horizontal direction satisfies a preset angle range.

According to an embodiment of the present disclosure, the first and second total reflection surfaces are arranged in a mirror image with respect to a plane parallel to the thickness direction of the anti-peep film and perpendicular to an arrangement direction of the plurality of anti-peep areas, and the incident and emission surfaces are arranged in a mirror image with respect to the plane parallel to the thickness direction of the anti-peep film and perpendicular to the arrangement direction of the plurality of anti-peep areas.

According to an embodiment of the present disclosure, along the thickness direction of the anti-peep film and away from the first side, angles between respective pairs of first and second total reflection surfaces of the plurality of prisms decrease, and angles between respective pairs of incident and emission surfaces of the plurality of prisms increase.

According to an embodiment of the present disclosure, when the at least one prism is the pentagonal prism, the pentagonal prism further includes a bottom surface.

According to an embodiment of the present disclosure, the set structure further includes an anti-peep layer, which surrounds the plurality of prisms, and a refractive index of the anti-peep layer is smaller than the refractive index of the at least one prism.

According to an embodiment of the present disclosure, the refractive index of the anti-peep layer is equal to the refractive index of the at least one transmission area.

According to an embodiment of the present disclosure, the anti-peep film further includes a top substrate and a bottom substrate, and the plurality of transmission areas and the plurality of anti-peep areas are alternately arranged between the upper and bottom substrates in the direction perpendicular to the thickness direction of the anti-peep film.

According to another aspect of the present disclosure, provided is a display module, including a display panel, a backlight module and the anti-peep film according to the present disclosure.

According to an embodiment of the present disclosure, the anti-peep film is provided on a light emission side of the display panel; and/or the anti-peep film is provided on a side of the display panel close to the backlight module.

According to yet another aspect of the present disclosure, provided is a manufacturing method of the anti-peep film according to the present disclosure, including: forming a plurality of prism groups spaced apart, where at least one prism group of the plurality of prism groups includes a plurality of prisms arranged in a thickness direction of the anti-peep film; and instilling optical glue between two adjacent prism groups of the plurality of prism groups, and curing the optical glue.

According to an embodiment of the present disclosure, forming the plurality of prism groups spaced apart includes: forming an optical layer with a set thickness; and engraving the optical layer using laser to form the plurality of prism groups. The at least one prism group includes a plurality of quadrangular prisms and/or pentagonal prisms arranged along the thickness direction of the anti-peep film.

According to an embodiment of the present disclosure, forming the plurality of prism groups spaced apart includes: forming an optical layer with a set thickness; and engraving the optical layer using a cutter to form the plurality of prism groups. The at least one prism group includes a plurality of quadrangular prisms and/or pentagonal prisms arranged along the thickness direction of the anti-peep film.

According to an embodiment of the present disclosure, forming the plurality of prism groups spaced apart includes: printing a plurality of quadrangular prisms and/or pentagonal prisms arranged along the thickness direction of the anti-peep film by layer, to form the at least one prism group, using a 3D printing method.

According to an embodiment of the present disclosure, instilling the optical glue between the two adjacent prism groups, and curing the optical glue includes: injecting photocurable glue between the two adjacent prism groups; and irradiating the photocurable glue with ultraviolet light. A refractive index of the photocurable glue is smaller than a refractive index of the at least one prism group.

The anti-peep film provided by the present disclosure includes a plurality of transmission areas and a plurality of anti-peep areas, and the plurality of transmission areas and the plurality of anti-peep areas are alternately arranged in a direction perpendicular to a thickness direction of the anti-peep film. At least one anti-peep area of the plurality of anti-peep areas has a set structure, and the set structure enables that light incident on the at least one anti-peep area from a first side in the thickness direction of the anti-peep film is reflected back to the first side through the at least one anti-peep area; therefore, the anti-peep film can increase a utilization rate of light energy of a film material, which solves a problem of low transmittance of the anti-peep film in a related art.

Additional aspects and advantages of the present disclosure will be partially given in the following description, which will become apparent from the following description or be learned through the practice of the present disclosure.

Figure 1:
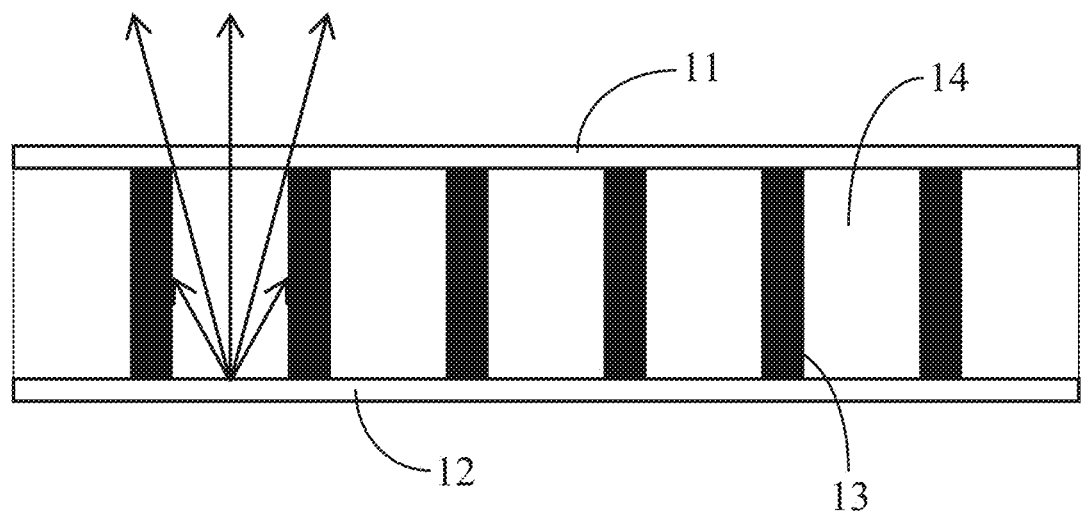
FIG. 1 is a schematic structural diagram of an anti-peep film in a related art.

Reference signs are descripted as follows: a first substrate 11, a second substrate 12, a light absorption grating 13, a transparent area 14, a top substrate 1, a bottom substrate 10, a transmission area 15, an anti-peep layer 20, a quadrangular prism 30, an incidence surface 40, an emission surface 80, a first total reflection surface 60, a second total reflection surface 65, a bottom surface 61, an upper surface 85 of a bottom substrate covered by a transmission area, a lower surface 100 of a top substrate covered by a transmission area, a right-side incidence surface 105 of an anti-peep area which is adjacent to a transmission area and on a left side of the transmission area, a left-side incidence surface 110 of an anti-peep area which is adjacent to a transmission area and on a right side of the transmission area, and an area to be carved 111.

DETAILED DESCRIPTION

The embodiments of the present disclosure are described in detail below, and examples of the embodiments are shown in the drawings, in which the same or similar reference numerals indicate the same or similar elements or elements having the same or similar functions throughout. The embodiments described below with reference to the drawings are exemplary, and are only used to explain the present disclosure, and cannot be construed as limiting the present disclosure.

Those skilled in the art can understand that unless specifically stated, the singular forms "a", "an", "said" and "the" used herein may also include the plural forms. It should be further understood that the words "include", "including", "comprise" and "comprising" used in the specification of the present disclosure refer to the presence of the described features, integers, steps, operations, elements and/or components, but do not exclude the presence or addition of one or more other features, integers, steps, operations, elements, components, and/or groups thereof. It should be understood that when an element is referred to as being "connected to" or "coupled to" another element, it may be directly connected to the other element, or there may be an intermediate element therebetween. In addition, the "connection" used herein may include a wireless connection. As used herein, the term "and/or" includes any and all combinations of one or more of the associated listed items.

Those skilled in the art can understand that unless otherwise defined, all terms (including technical and scientific terms used herein have the same meaning as those generally understood by those of ordinary skill in the art to which this disclosure belongs. It should also be understood that terms such as those defined in a general dictionary should be understood to have meanings consistent with the meanings in the context of related technologies, and unless specifically defined as here, will not be interpreted with idealized or overly formal meanings.

Figure 2:
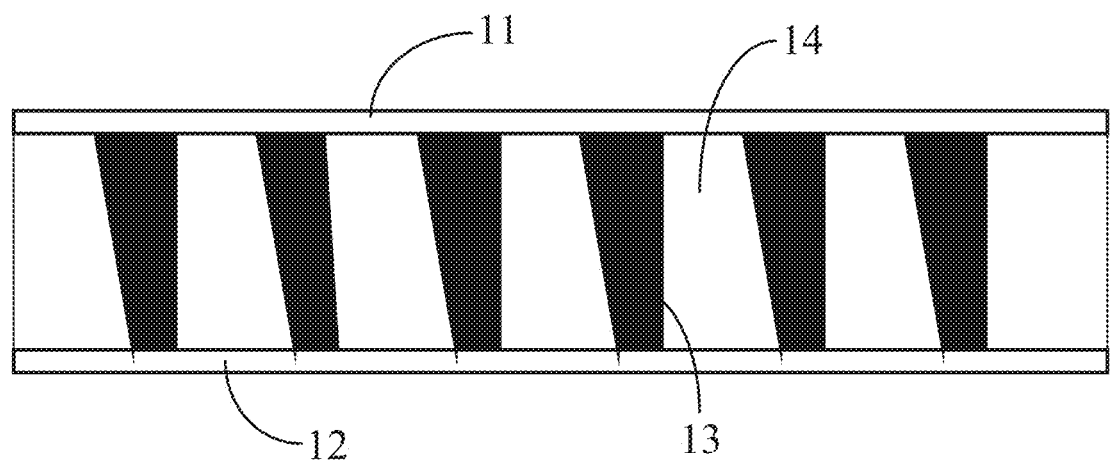
FIG. 2 is another schematic structural diagram of an anti-peep film in a related art.
Figure 3:
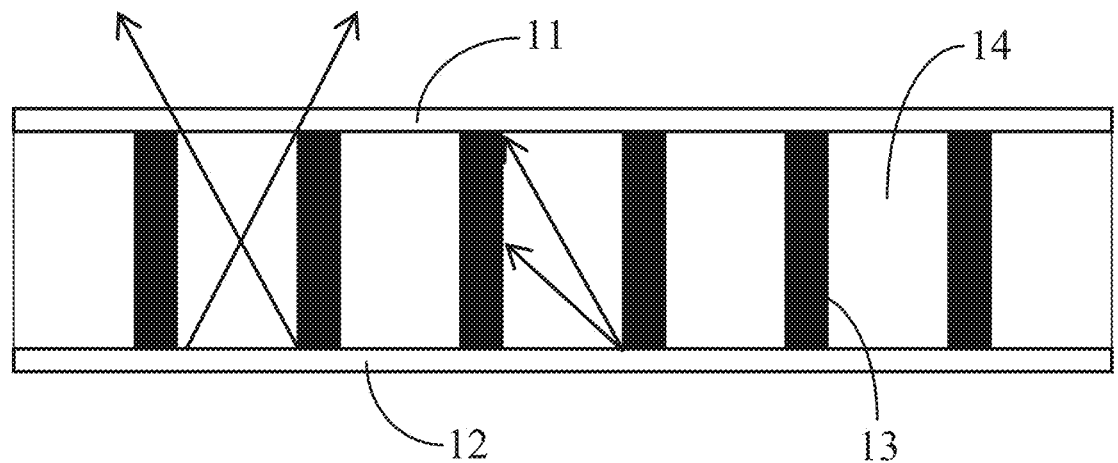
FIG. 3 is a schematic diagram of a light emission range of an anti-peep film in a related art.

The inventor of the present disclosure found that, as shown in FIGS. 1 and 2 which illustrate two schematic structural diagrams of an anti-peep film in a related art, the anti-peep film in the related art is generally composed of a first substrate 11, a second substrate 12, and a functional area between them. There are several light absorption gratings 13 in the functional area, and the light absorption gratings 13 divide the functional area into a plurality of transparent areas 14. Therefore, as shown in a schematic diagram of a light emission range of the anti-peep film in the related art in FIG. 3, light incident from any point in a transparent area on a surface of the second substrate 12, is absorbed by the light absorption grating 13, if the light is blocked by the light absorption grating 13. Light that is not blocked by the light absorption gratings 13 passes normally.

The anti-peep film in the related art uses a method in which light of a narrow angle range (i.e., an angle range in which a light intensity attenuation is 5% of a central light intensity) is transmitted and light of a large angle range is blocked (i.e., absorbed), to achieve an anti-peep function, and the angle range for viewing is generally about 30°. However, the loss of light energy is large, and the brightness is reduced by about 50% or more. For a liquid crystal display device that requires high brightness, when such an anti-peep film is used, in order to ensure the brightness, a drive current of the display device is usually required to be increased to more than twice the original drive current to increase backlight, and thus increase the brightness.

The inventor of the present disclosure found that, currently anti-peeping is carried out by light absorption gratings. An anti-peep angle is related to a thickness of the anti-peep film. The greater the thickness of the anti-peep film is, the better the anti-peep effect is. The conventional thickness of the anti-peep film in the related art is 320 μm. Therefore, the use of the anti-peep film in the related art greatly increases a thickness of a backlight and improves luminous power, which is not conducive to energy saving and environmental protection.

In order to solve the above problems, the embodiments of the present disclosure provide a new anti-peep film. The specific technical solutions of the embodiments of the present disclosure will be described below with reference to the drawings.

Figure 4:
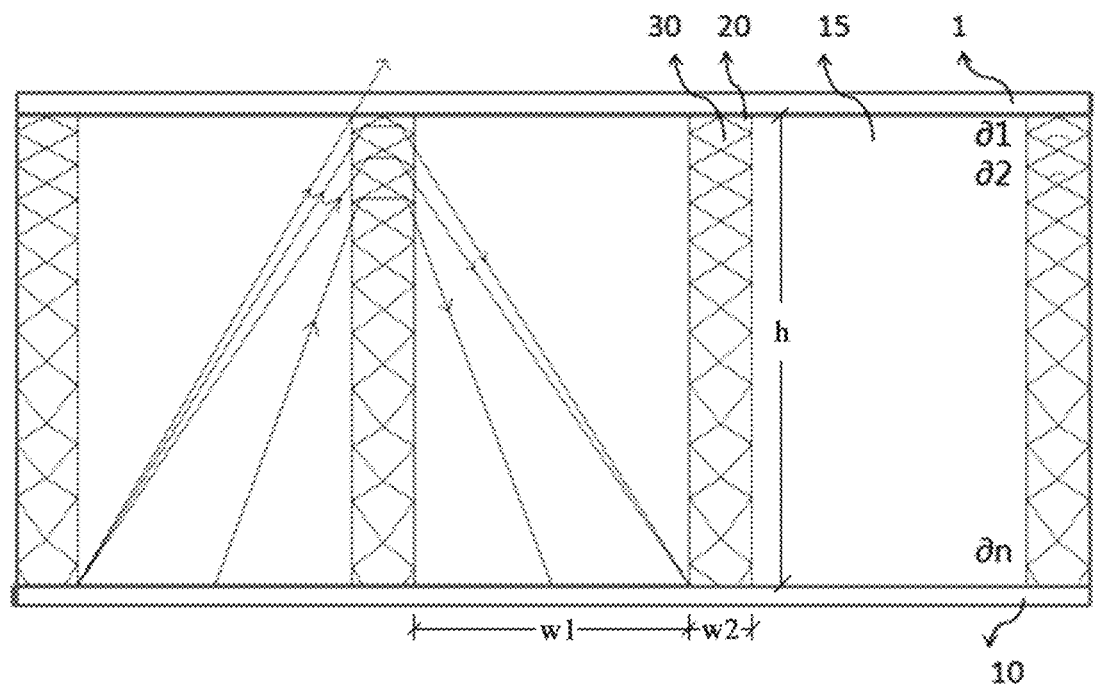
FIG. 4 is a schematic cross-sectional view of an anti-peep film according to an embodiment of the present disclosure.

As shown in FIG. 4, which is a schematic cross-sectional view of an anti-peep film according to an embodiment of the present disclosure, the anti-peep film includes a plurality of transmission areas 15 and a plurality of anti-peep areas (the areas indicated by reference numerals 20 and 30 in the figure). The plurality of transmission areas 15 and anti-peep areas are alternately arranged in a direction perpendicular to a thickness direction of the anti-peep film. Each anti-peep area is constructed as a structure which enables that light incident on the anti-peep area from a first side in the thickness direction of the anti-peep film is reflected back to the first side through the anti-peep area.

The anti-peep film provided according to the embodiments of the present disclosure includes the plurality of transmission areas and the plurality of anti-peep areas, and the plurality of transmission areas and the plurality of anti-peep areas are alternately arranged in the direction perpendicular to the thickness direction of the anti-peep film; and each anti-peep area is constructed as the structure which enables that light incident on the anti-peep area from the first side in the thickness direction of the anti-peep film is reflected back to the first side through the anti-peep area; therefore, the anti-peep film provided according to the embodiments of the present disclosure may increase a utilization rate of light energy of a film material, which solves a problem of low transmittance of the anti-peep film.

According to an embodiment of the present disclosure, as shown in FIG. 4, the anti-peep film may include a top substrate 1 and a bottom substrate 10, and the transmission areas 15 and the anti-peep areas are alternately arranged between the top substrate 1 and the bottom substrate 10 in a direction parallel to the top substrate 1 and the bottom substrate 10. Materials of the top substrate 1 and the bottom substrate 10 may have ball impact resistance and/or scratch resistance properties, and may specifically be poly methyl Methacrylate (PMMA), also known as acrylic or plexiglass. The materials may also be Polyethylene Terephthalate (PET); of course, the materials may also be other optical plastics. Thicknesses of the top substrate 1 and the bottom substrate 10 may be equivalent to a thickness of a functional layer in which the transmission areas 15 are located; and their thicknesses may also be different according to different application scenarios. For example, for the anti-peep film applied to a Monitor (MNT), in order to ensure the reliability and wrinkle resistance performance of the film material, an overall thickness of the anti-peep film may be more than 550 μm, and the thickness of the functional layer in which the transmission areas 15 are located may be about 200 μm; and for the anti-peep film applied to a mobile phone, a total thickness of 200 μm~300 μm may meet a reliability requirement.

According to an embodiment of the present disclosure, a structure of at least one anti-peep area may meet the following requirements of two aspects: first, the structure of the anti-peep area is symmetrically arranged, to ensure that light incident on the anti-peep area from both of the left and right sides can be reused; and second, it can ensure that large-angle light does not pass through the structure and exit the anti-peep film, or an angle of the large-angle light exiting the anti-peep film meets anti-peep requirements.

According to an embodiment of the present disclosure, as shown in FIG. 4, the at least one anti-peep area may include a plurality of prisms, and the plurality of prisms are arranged along the thickness direction of the anti-peep film. That is, the plurality of prisms are arranged along a direction from the bottom substrate 10 to the top substrate 1. In a possible embodiment, a prism may be a quadrangular prism 30 and/or a pentagonal prism. Of course, in the actual design, the anti-peep area may also be set to other structures which enable that the direction of the large-angle light can be reversed, and the large-angle light can be reused.

When the anti-peep film provided according to the embodiments of the present disclosure is applied to a backlight module, as shown in FIG. 4, among light reflected by the quadrangular prism 30, a part that does not exit the transmission area 15 may re-enter the backlight module, and may be re-modulated by microstructures of each layer of the backlight module and a bottom reflection sheet to change an original propagation direction. When the light is emitted again, it may still be divided into two parts, one part emits from a transmission area 15; and the other part is returned to the backlight module again, and its propagation direction is re-modulated, thereby improving a utilization rate of light energy of the film material.

According to an embodiment of the present disclosure, as shown in FIG. 4, the at least one anti-peep area may further include an anti-peep layer 20, and the anti-peep layer 20 is disposed around the prisms. That is, the anti-peep layer 20 may surround the plurality of prisms in the at least one anti-peep area, and a refractive index of the anti-peep layer 20 is smaller than a refractive index of the prism. A refractive index difference may be formed between an inner prism and the outer anti-peep layer 20, so that total reflection conditions may be satisfied, and light entering the prism and the anti-peep layer 20 may be reused after two total reflections. In one possible embodiment, the refractive index of the anti-peep layer 20 may be equal to the refractive index of the transmission areas 15. Of course, the refractive index of the anti-peep layer 20 may not be equal to the refractive index of the transmission areas 15.

Figure 5:
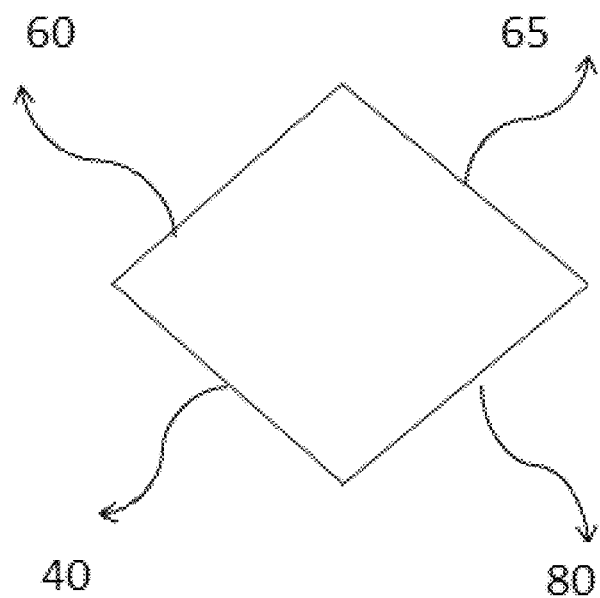
FIG. 5 is a schematic cross-sectional view of a quadrangular prism in an anti-peep area included in an anti-peep film according to an embodiment of the present disclosure.

According to an embodiment of the present disclosure, as shown in FIG. 5, it is a schematic cross-sectional view of a quadrangular prism in an anti-peep area included in an anti-peep film according to an embodiment of the present disclosure. That is, FIG. 5 shows a cross-sectional view of the quadrangular prism 30 along an arrangement direction of the quadrangular prisms 30, that is, along the direction from the bottom substrate 10 to the top substrate 1. The quadrangular prism 30 may include an incident surface 40, a first total reflection surface 60, a second total reflection surface 65, and an emission surface 80. The first and second total reflection surfaces 60 and 65 may be arranged in a mirror image with respect to a plane parallel to the thickness direction of the anti-peep film and perpendicular to an arrangement direction of the plurality of anti-peep areas, and the incident and emission surfaces 40 and 80 may be arranged in a mirror image with respect to the plane parallel to the thickness direction of the anti-peep film and perpendicular to the arrangement direction of the plurality of anti-peep areas. Therefore, light incident from both sides of an anti-peep area may be effectively modulated.

According to an embodiment of the present disclosure, as shown in FIGS. 4 and 5, along the thickness direction of the anti-peep film and away from the bottom substrate 10, the plurality of quadrangular prisms 30 are arranged in such a manner that angles between respective pairs of first and second total reflection surfaces 60 and 65 decrease, and angles between respective pairs of incident and emission surfaces 40 and 80 increase. That is, in the plurality of quadrangular prisms 30 in an anti-peep area, angles between the first total reflection surface 60 and the second total reflection surface 65 become smaller and smaller, and angles between the incident surface 4C) and the emission surface 80 become larger and larger, along the direction from the bottom substrate 10 to the top substrate 1.

Figure 6:
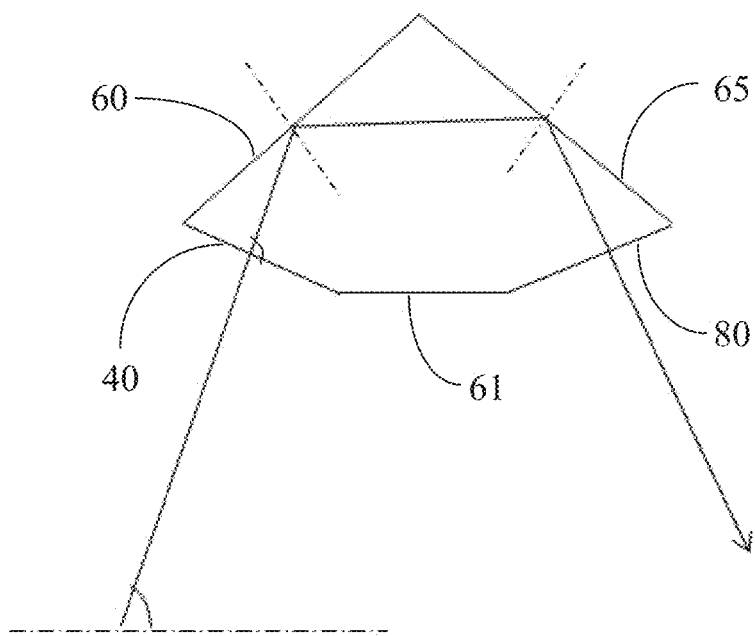
FIG. 6 is a schematic cross-sectional view of a pentagonal prism in an anti-peep area included in an anti-peep film according to an embodiment of the present disclosure.

According to an embodiment of the present disclosure, as shown in FIG. 6, it is a schematic cross-sectional view of a pentagonal prism in an anti-peep area included in an anti-peep film according to an embodiment of the present disclosure. That is, FIG. 6 shows a cross-sectional view of a pentagonal prism along an arrangement direction of pentagonal prisms, that is, along the direction from the bottom substrate 10 to the top substrate 1. The pentagonal prism may include an incident surface 40, a first total reflection surface 60, a second total reflection surface 65, and an emission surface 80. The first and second total reflection surfaces 60 and 65 may be arranged in a mirror image with respect to the plane parallel to the thickness direction of the anti-peep film and perpendicular to the arrangement direction of the plurality of anti-peep areas, and the incident and emission surfaces 40 and emission 80 may be arranged in a mirror image with respect to the plane parallel to the thickness direction of the anti-peep film and perpendicular to the arrangement direction of the plurality of anti-peep areas. Therefore, light incident from both sides of an anti-peep area may be effectively modulated. In addition, a five-prism structure is more conducive to adjusting the angle between the incident and emission surfaces of the prism, which facilitates a realization of total reflection conditions.

According to an embodiment of the present disclosure, directions of the incident surface and the emission surface may be adjusted by adjusting a size of a bottom surface 61 of the pentagonal prism, so as to ensure the incident light to meet total reflection conditions. Therefore, a structure of the pentagonal prism may be adopted for a requirement of thinner thickness or smaller anti-peep angle.

According to an embodiment of the present disclosure, as shown in FIG. 6, along the thickness direction of the anti-peep film and away from the bottom substrate 10, the plurality of pentagonal prisms are arranged in such a manner that angles between respective pairs of first and second total reflection surfaces 60 and 65 decrease, and angles between respective pairs of incident and emission surfaces 40 and 80 increase. That is, in the plurality of pentagonal prisms in an anti-peep area, angles between the first total reflection surface 60 and the second total reflection surface 65 become smaller and smaller, and angles between the incident surface 40 and the emission surface 80 become larger and larger, along the direction from the bottom substrate 10 to the top substrate 1.

The following describes the operating principle of the anti-peep film provided according to the embodiments of the present disclosure through specific examples.

As shown in FIG. 4, an angle between the incident surface and the emission surface of the first quadrangular prism closest to the top substrate 1 is $\partial 1$, and an angle between the incident surface and the emission surface of the second quadrangular prism second closest to the top substrate 1 is $\partial 2$, and so on; and an angle between the incident surface and the emission surface of the n-th quadrangular prism farthest from the top substrate 1 is $\partial n$. From the first quadrangular prism to the n-th quadrangular prism, respective angles between two total reflection surfaces gradually increase, and respective angles c between incident and emission surfaces gradually decrease.

According to an embodiment of the present disclosure, a height h of the anti-peep area (i.e., the thickness of the functional layer in which the transmission areas 15 are located) may range from 80 μm to 250 μm, a width w1 of the transmission area may range from 30 μm to 50 μm, and a width w2 of the anti-peep area may range from 15 μm to 30 μm. According to the embodiments provided according to the present disclosure, the above-mentioned various sizes may also be adjusted according to different specific application scenarios.

Figure 7:
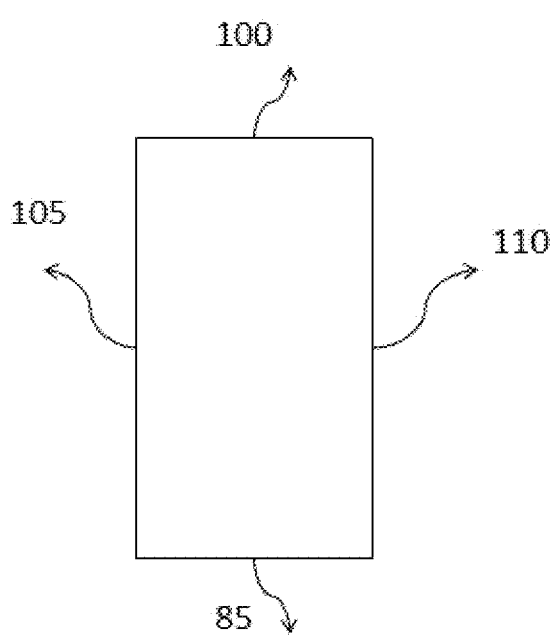
FIG. 7 is a schematic cross-sectional view of a transmission area included in an anti-peep film according to an embodiment of the present disclosure.

As shown in FIG. 7, which is a schematic cross-sectional view of a transmission area included in an anti-peep film according to an embodiment of the present disclosure, 85 represents an upper surface of the bottom substrate covered by the transmission area, 100 represents a lower surface of the top substrate covered by the transmission area, 105 represents a right-side incidence surface of an anti-peep area which is adjacent to the transmission area and on a left side of the transmission area, and 110 represents a left-side incidence surface of an anti-peep area which is adjacent to the transmission area and on a right side of the transmission area.

Figure 8:
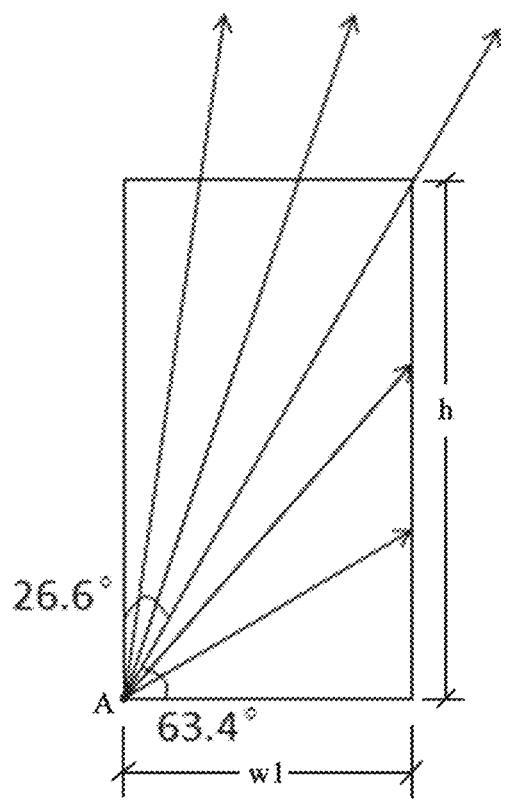
FIG. 8 is a schematic diagram of propagation paths of light in a transmission area according to an embodiment of the present disclosure.

As shown in FIG. 8, it is a schematic diagram of propagation paths of light in a transmission area according to an embodiment of the present disclosure. For example, a width w1 of the transmission area is 44 μm, a height h of the anti-peep area is 88 μm, a refractive index of the transmission area is 1.4936, and a refractive index of the quadrangular prism 30 is 1.5896. The angle between light emitted from the transmission area and a vertical direction ranges from −26.6°~+26.6°. The angle between a horizontal direction and the light, which is emitted from the farthest point A on the upper surface of the bottom substrate 10 covered by the transmission area and incident on the first quadrangular prism of an anti-peep area which is adjacent to the transmission area and on the right side of the transmission area, is 63.4°. A total reflection angle $\partial$ of the quadrangular prism 30 satisfies: sin $\partial$=1.4936/1.5896; that is, $\partial \approx 70°$. Therefore, when the angle between the first total reflection surface of the first quadrangular prism and the horizontal plane is greater than or equal to 43.4° (=63.4°−(90°−70°)), the total reflection conditions are satisfied.

Figure 9:
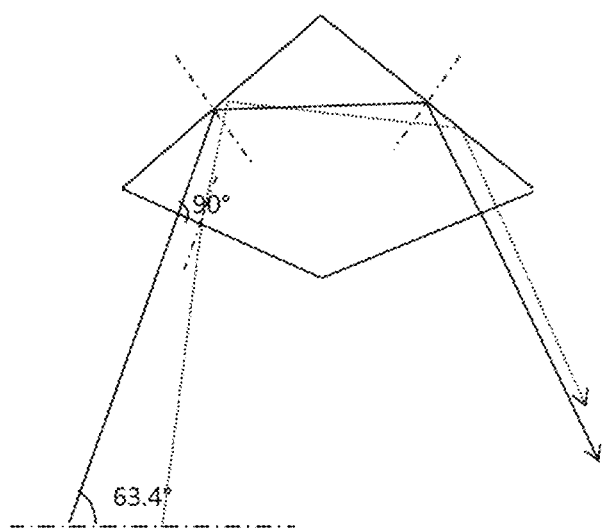
FIG. 9 is a schematic diagram of an operating principle of a quadrangular prism according to an embodiment of the present disclosure.

As shown in FIG. 9, which is a schematic diagram of an operating principle of a quadrangular prism 30 according to an embodiment of the present disclosure, when the angle between incident light and the horizontal direction is greater than 63.4°, if an angle of 2° is added, it can ensure that the inclination of the first total reflection surface of the first quadrangular prism still meets the total reflection conditions. As the angle between the incident light and the horizontal direction gradually increases, and the angle exceeds that for meeting the total reflection conditions of the first total reflection surface of the first quadrangular prism, the incident light may enter the second quadrangular prism. According to the total reflection conditions, an angle between light rays, which are emitted from the farthest point A on the upper surface of the bottom substrate 10 covered by the transmission area and reach the first and second quadrangular prisms respectively, is 2.5°.

The brightness of film layers of the anti-peep film provided according to the embodiments of the present disclosure is more than 1.5 times that of a conventional anti-peep film material. For example, if there are 200 light rays in the backlight and the light transmittance of the conventional anti-peep film is 50%, 100 light rays will pass through. In the anti-peep film provided according to the embodiments of the present disclosure, 100 light rays pass through normally, and the other 100 light rays are fully reflected back to the backlight module to be reused; when the reflected light are reused, 50% of the light rays still pass through light-transmitting areas normally, that is, 50 light rays are transmitted normally, and the other 50 light rays are remodulated; and after several modulations, a total number of light rays exiting the anti-peep film is: 100+50+25+12.5+ . . . . It can be known from calculations that the brightness of film layers of the anti-peep film provided according to the embodiments of the present disclosure is more than 1.5 times that of the conventional anti-peep film material.

An embodiment of the present disclosure also provides a display module. The display module may include a display panel, a backlight module, and the aforementioned anti-peep film provided according to the embodiments of the present disclosure. The anti-peep film may be disposed between the backlight module and the display panel.

The anti-peep film provided according to the embodiments of the present disclosure is provided with the quadrangular prisms 30 or pentagonal prisms in the anti-peep areas Light incident on the anti-peep area may be reflected by the quadrangular prism 30 or the pentagonal prism twice, and then enters the backlight module again to be reused. Therefore, the utilization of light energy of film layers can be increased, and the technical problem of low transmittance of the anti-peep film can be solved, which can ensure that display information is protected in public places without losing the brightness of the backlight module.

According to an embodiment of the present disclosure, the anti-peep film provided according to the embodiments of the present disclosure may be disposed on a light emission side of the display panel, and/or disposed on a side of the display panel close to the backlight module.

Figure 10:
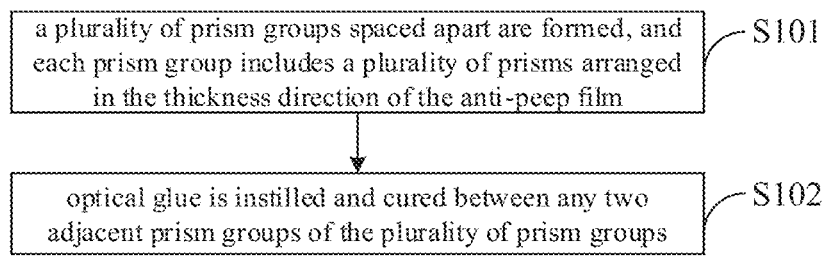
FIG. 10 is a flowchart of a manufacturing method of an anti-peep film according to an embodiment of the present disclosure.

An embodiment of the present disclosure also provides a manufacturing method of the above-mentioned anti-peep film. As shown in FIG. 10, it is a flowchart of the manufacturing method of the anti-peep film according to an embodiment of the present disclosure. The manufacturing method of the anti-peep film may include steps S101 and S102.

In step S101, a plurality of prism groups spaced apart are formed, and each prism group includes a plurality of prisms arranged in the thickness direction of the anti-peep film.

In step S102, optical glue is instilled and cured between any two adjacent prism groups of the plurality of prism groups.

According to an embodiment of the present disclosure, instilling the optical glue between the any two adjacent prism groups, and curing the optical glue may include: injecting photocurable glue between the any two adjacent prism groups, and irradiating the photocurable glue with ultraviolet light. A refractive index of the photocurable glue is lower than a refractive index of the prism group.

According to an embodiment of the present disclosure, forming the plurality of prism groups spaced apart may include: forming an optical layer with a set thickness; and engraving the optical layer using laser to form the plurality of prism groups. At least one prism group includes a plurality of quadrangular prisms 30 and/or pentagonal prisms arranged along the thickness direction of the anti-peep film.

Figure 11A:
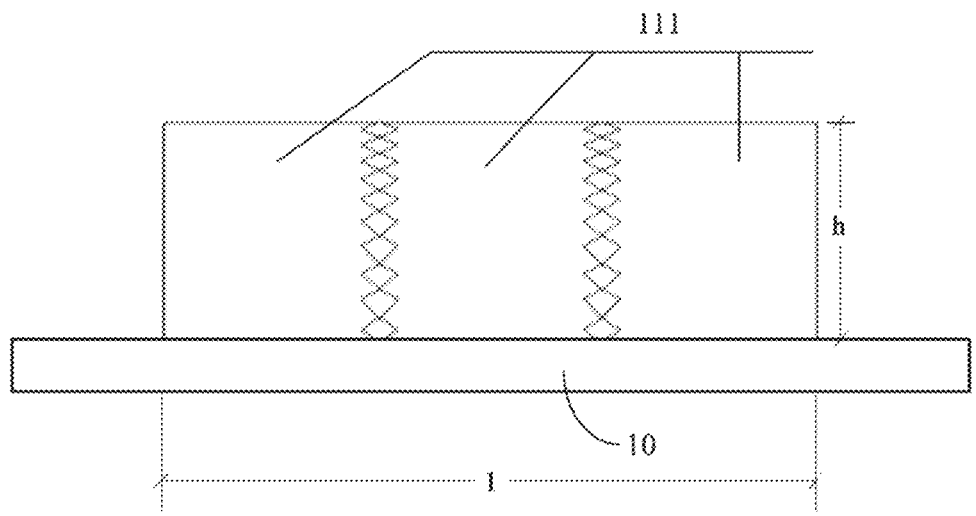
FIGS. 11*a*-11*d* are schematic flowcharts of manufacturing an anti-peep film by means of engraving according to an embodiment of the present disclosure.

According to an embodiment of the present disclosure, as shown in FIGS. 11a-11d, they are schematic flowcharts of manufacturing an anti-peep film by means of engraving according to an embodiment of the present disclosure. As shown in FIG. 11a, an optical photocurable material n3 having a first refractive index is cured on the upper surface of the bottom substrate 10. A thickness of the bottom substrate 10 may be 50 μm~125 μm, and a thickness a height h) of the optical photocurable material n3 may be 88 μm, and a length 1 and a width w (not shown in FIG. 11a) may be 600 mm and 350 mm, respectively. In FIG. 11a, the area 111 represents an area to be carved, where the optical photocurable material n3 is to be engraved and removed.

Next, a structure formed by shaping the optical photocurable material n3 and the bottom substrate 10 is placed on a lifting table, and a telephoto laser is placed over the lifting table and faces a plane defined by the length and height of the optical photocurable material n3. Quadrangular prisms 30 or pentagonal prisms are engraved using laser along a width (350 mm) direction of the optical photocurable material n3; and for every 5 mm to 10 mm being carved, the lifting table is raised a corresponding distance to make the optical photocurable material n3 close to the telephoto laser by the corresponding distance until the engraving of 350 mm width is completed, and a structure is formed as shown in FIG. 11c.

Figure 11B:
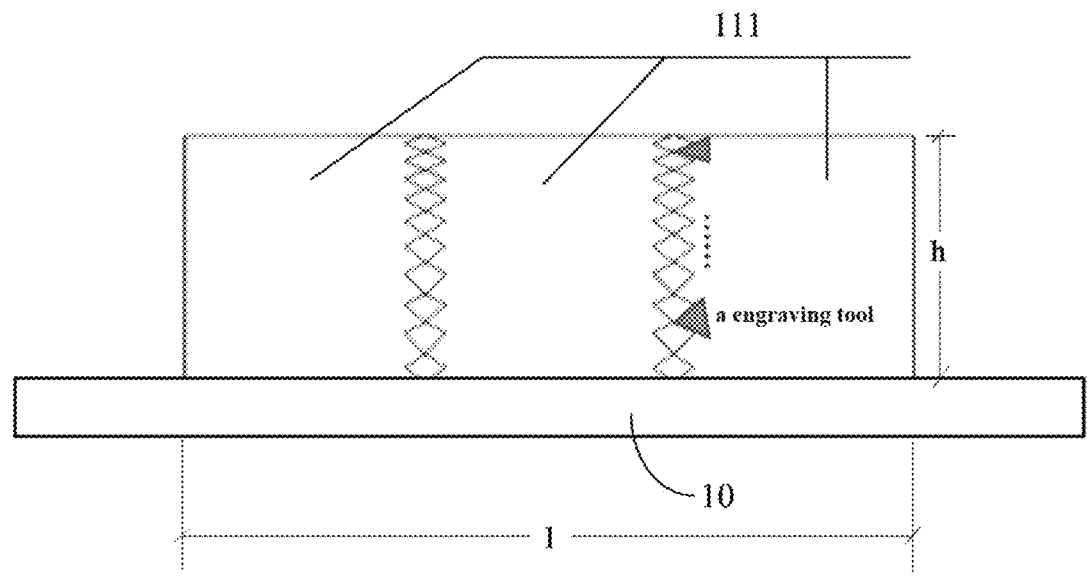
Figure 11C:
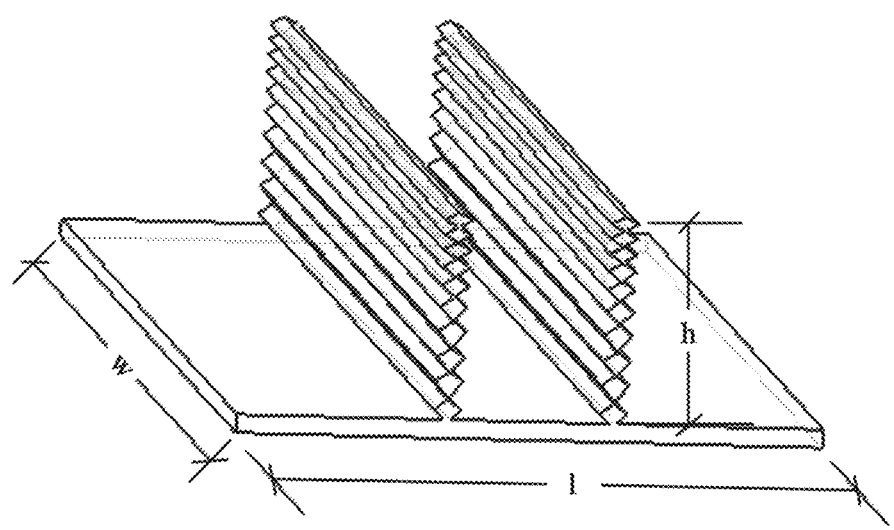

According to an embodiment of the present disclosure, as shown in FIG. 11b, an engraving tool may be moved horizontally along the width (350 mm) direction of the optical photocurable material n3, and the quadrangular prisms 30 or pentagonal prisms are engraved using the engraving tool, until the engraving of 350 mm width is completed, and a structure is formed as shown in FIG. 11c.

Figure 11D:
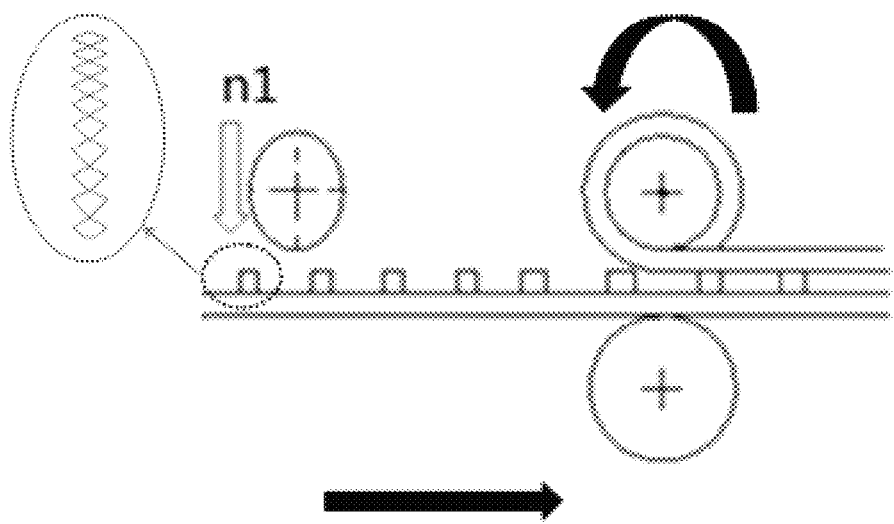

Next, as shown in FIG. 11d, an optical photocurable material n1 having a second refractive index is injected into spaces between the engraved quadrangular prisms 30 or pentagonal prisms. The optical photocurable material n3 and the optical photocurable material n1 may be materials such as UV-curable acrylic glue with high light transmittance, and other materials. The refractive index of the optical photocurable material n1 may be smaller than the refractive index of the optical photocurable material n3. The optical photocurable material n1 is cured with ultraviolet light.

Finally, as shown in FIG. 11d, the top substrate 1 is formed by a stitching process, and is cured with ultraviolet light. The horizontal right arrow in FIG. 11c indicates a moving direction of the bottom substrate 10, and the curved arrow in FIG. 11c indicates a stitching direction of the top substrate 1 when it is formed.

Anti-peep films manufactured by engraving may be applied to small display products such as mobile phones.

According to an embodiment of the present disclosure, forming the plurality of prism groups spaced apart may include: for one prism group, printing quadrangular prisms 30 and/or pentagonal prisms layer-by-layer using a 3D printing method.

Specifically, the 3D printing method may be used to print the quadrilateral prisms 30 and/or the pentagonal prisms layer-by-layer on the bottom substrate 10, using the optical photocurable material n3. Next, the optical photocurable material n1 is injected into spaces between the printed quadrangular prisms 30 and/or pentagonal prisms, and ultraviolet curing is performed, Finally, the top substrate 1 is stitched and subjected to ultraviolet curing treatment after stitching.

The anti-peep film made in this way may be applied to full-screen products such as mobile phones and MNTs.

In summary, the anti-peep film and the display module provided according to the embodiments of the present disclosure have the following beneficial effects: first, the anti-peep film provided according to the embodiments of the present disclosure includes a plurality of transmission areas and a plurality of anti-peep areas, and the plurality of transmission areas and the plurality of anti-peep areas are alternately arranged in a direction perpendicular to a thickness direction of the anti-peep film; and each anti-peep area is constructed as a structure which enables that light incident on the anti-peep area from the first side in the thickness direction of the anti-peep film is reflected back to the first side through the anti-peep area; and therefore, the anti-peep film provided according to the embodiments of the present disclosure may increase utilization rate of light energy of a film material, which solves a problem of low transmittance of the anti-peep film. Second, the anti-peep film provided according to the embodiments of the present disclosure is provided with the quadrangular prisms 30 or pentagonal prisms in the anti-peep areas. Light incident on an anti-peep area may be reflected by a quadrangular prism 30 or a pentagonal prism twice, and then enters the backlight module again to be reused. Therefore, the utilization rate of light energy of film layers is increased, and the technical problem of low transmittance of the anti-peep film is solved, which can ensure that display information is protected in public places without losing the brightness of the backlight module.

The above is only embodiments of the present disclosure, and it should be noted that, for those skilled in the art, several improvements and modifications may be made without departing from the principles of the present disclosure, and these improvements and modifications should also be considered within the protection scope of the present disclosure.

The invention claimed is:

1. An anti-peep film, comprising a top substrate, a bottom substrate, a plurality of transmission areas and a plurality of anti-peep areas 20, wherein the plurality of transmission areas and the plurality of anti-peep areas 20 are alternately arranged between the top substrate and the bottom substrate in a direction parallel to the top substrate and the bottom substrate;

wherein each one of at least one anti-peep area of the plurality of anti-peep areas comprises
a plurality of prisms arranged in a direction perpendicular to the top and bottom substrates and
anti-peep layer arranged between the plurality of prisms and transmission areas adjacent to the at least one anti-peep areas, and
light incident on the transmission areas adjacent to the at least one anti-peep area from a first side of the anti-peep layer in the direction perpendicular to the top and bottom substrates transmits to inside of at least one prism of the plurality of prisms, is totally reflected at interfaced between the anti-peep layer and the at least one prism, then exists the at least one prism and transmits back to the first side;
wherein the at least one prism of the plurality of prisms is a quadrangular prism or a pentagonal prism;
wherein a refractive index of at least one transmission areas adjacent to the one anti-peep area is smaller than a refractive index of the at least one prism;
wherein
the at least one prism comprises an incident surface, a first total reflection surface, a second total reflection surface, and an emission surface;
the interfaces between the anti-peep layer on both sides comprises the first total reflection surface and second total reflection surface, the light transmits to the inside of the at least one prism through the incident surface and exists the at least one prism through the emission surface;
an angle between the light and a direction parallel to the top substrate and the bottom substrate satisfies a preset angle range,
wherein along the direction perpendicular to the top and bottom substrate and away from the first side, angles between respective pairs of first and second total reflection surfaces of the plurality of prisms decrease, and angles between respective pairs of incident and emission surfaces of the plurality of prisms increase.

2. The anti-peep film of claim 1, wherein the first and second total reflection surfaces are arranged in a mirror image with respect to a plane parallel to the direction perpendicular to the top and bottom substrates and perpendicular to the direction parallel to the top substrate and the bottom substrate, and the incident and emission surfaces are arranged in a mirror image with respect to the plane parallel to the direction perpendicular to the top and bottom substrates and perpendicular to the direction parallel to the top substrate and the bottom substrate.

3. The anti-peep film of claim 1, wherein when the at least one prism is the pentagonal prism, the pentagonal prism further comprises a bottom surface.

4. The anti-peep film of claim 1, wherein a refractive index of the anti-peep layer is smaller than the refractive index of the at least one prism.

5. The anti-peep film of claim 4, wherein the refractive index of the anti-peep layer is equal to the refractive index of one of the transmission areas adjacent to the one anti-peep area.

6. A display module, comprising a display panel, a backlight module and the anti-peep film of claim 1.

7. The display module of claim 6, wherein the anti-peep film is provided on a light emission side of the display panel; and/or the anti-peep film is provided on a side of the display panel close to the backlight module.

8. A manufacturing method of the anti-peep film of claim 1, comprising:
forming a plurality of prism groups spaced apart on the bottom substrate; wherein each of at least one prism group of the plurality of prism groups comprises a plurality of prisms arranged in the direction perpendicular to the top and bottom substrates; and
instilling an optical photocurable material between two adjacent prism groups of the plurality of prism groups, and curing the optical photocurable material.

9. The manufacturing method of claim 8, wherein forming the plurality of prism groups spaced apart on the bottom substrate comprises:

forming an optical layer with a set thickness on the bottom substrate; and engraving the optical layer using laser to form the plurality of prism groups, wherein each of the at least one prism group comprises a plurality of quadrangular prisms and/or pentagonal prisms arranged along the direction perpendicular to the top and bottom substrates.

10. The manufacturing method of claim 8, wherein forming the plurality of prism groups spaced apart on the bottom substrate comprises:

forming an optical layer with a set thickness on the bottom substrate; and engraving the optical layer using a cutter to form the plurality of prism groups; wherein the at least one prism group comprises a plurality of quadrangular prisms and/or pentagonal prisms arranged along the direction perpendicular to the top and bottom substrates.

11. The manufacturing method of claim 8, wherein forming the plurality of prism groups spaced apart on the bottom substrate comprises:

printing a plurality of quadrangular prisms and/or pentagonal prisms arranged along the direction perpendicular to the top and bottom substrates on the bottom substrate by layer, to form the at least one prism group, using a 3D printing method.

12. The manufacturing method of claim 8, wherein instilling the optical photocurable material between the two adjacent prism groups, and curing the optical photocurable material comprises:

injecting photocurable glue between the two adjacent prism groups; and irradiating the photocurable glue with ultraviolet light;

wherein a refractive index of the photocurable glue is smaller than a refractive index of the at least one prism group.

\* \* \* \* \*